United States Patent Office 3,767,812
Patented Oct. 23, 1973

3,767,812
NON-SURGICAL REMOVAL OF ABNORMAL
BONE PROLIFERATION
Geraldine H. Thiele, Glen-Haven Farm, Rte. 1, Box 12,
Windber, Pa. 15963
No Drawing. Continuation-in-part of application Ser. No.
113,362, Feb. 8, 1971. This application Mar. 12, 1971,
Ser. No. 123,830
Int. Cl. A61k 27/00
U.S. Cl. 424—315               11 Claims

ABSTRACT OF THE DISCLOSURE

This invention involves a process of accelerating the death and destruction of bony cells producing unwanted new bone proliferation, say, both without and within joint capsules. This is not a surgical procedure but is accomplished by injecting a dosage of a liquefied composition comprised of a vascular sclerosing *anionic* agent and a liquid carrier into and around abnormal new bone proliferations. Subsequent dosages are preferably administered approximately every five days, but the injection intervals depend on the density and location of the calcium deposits. This injection method is also used to remove unwanted new bone proliferations which occur immediately around the region of or on the perimeter of a broken bone. This invention can be used to treat both man and animal.

After the above treatment is completed, the fractures and nonunions of bones are more readily heated without muscle atrophy, etc., by injecting a liquefied composition containing a non-necrotic vascular sclerosing agent (e.g., sodium morrhuate) into the site of the fracture or nonunion. No cast is used.

This application is a continuation-in-part application of applicant's copending applicaton whch was filed on Feb. 8, 1971, is titled "Method of Treating Bone Fractures and Non-Unions" and has U.S. Ser. No. 113,362.

PRIOR ART

Heretofore, it was necessary to surgically remove, if possible, abnormal new bone proliferations (spurs, calcium deposits) when they occurred in and around break areas in bones, particularly joints.

Bassett, C. Andrew, "Electrical Effects in Bone," Scientific American, October 1965, vol. 213, No. 4, pp. 18–25, discloses that when bone is mechanically deformed, it generates a small electric current.

Known vascular sclerosing anionic agents include sodium tetradecylsulfate and similar materials. U.S. Pat. No. 2,497,742 discloses the use of aqueous solutions of sodium tetradecylsulfate as a vascular sclerosing anionic agent. That patent further teaches the use of vascular sclerosing anionic agents which are an organic sulfate or sulfonate including a cationic constituent, the other constituent (linked to —OSO$_3$—or —SO$_3$—) being a chain composed of one or more aliphatic hydrocarbon residues and one or more residues that provide links (in the stated chain) of a selected character other than —CH$_2$— or —CH$_3$.

BROAD DESCRIPTION OF THE INVENTION

This invention involves a process of accelerating the death and destruction of bony cells producing unwanted new bone proliferation, say, both without and within joint capsules. This is not a surgical procedure but is accomplished by injecting a dosage of a liquefied composition comprised of a vascular sclerosing *anionic* agent and a liquid carrier into and around abnormal new bone proliferations. Subsequent dosages are preferably administered approximately every five days, but the injection interval depends on the density and location of the calcium deposits. This injection method is also used to remove unwanted new bone proliferations which occur immediately around the region of or in the perimeter of a broken bone (or fractured bone or nonunion). This invention can be used to treat both man and animal. In a sense, this invention involves the absorption of abnormal new bone proliferation.

Each dosage contains between about 1 cc. and about 10 cc., although a 5 cc. is normally used. The liquefied composition should contain between about 0.5 and about 5 weight percent of a vascular sclerosing anionic agent, and preferably between about 1 and about 3 percent of a vascular sclerosing anionic agent. The liquefied composition should have a pH between 6 and 10, and preferably between about 7 and about 8.1, and most preferably about 7.2.

The preferred liquefied composition is comprised of an aqueous solution of 3 weight percent of sodium tetradecyl sulfate. The preferred liquefied composition contains 2 percent benzyl alcohol, is buffered with disodium phosphate and is adjusted with sodium dihydrogen phosphate or sodium hydroxide to a pH of about 7 to about 8.1.

This present invention can be used to treat man and animal. This invention is particularly useful in the treatment of racing and trotting horses; but can be used to treat, for example, all equine, e.g. horses and mules, donkeys, sheep, goats, swine, bovines, e.g., oxen and cows, dogs, cats, etc. Racing and trotting horses can be cured by this invention so that they can again race or trot. Horses can also be cured so that they can be used as breed mares or studs.

The process of this invention can also be used to remove arthritic spurs or deposits or growths which result from certain types of arthritis. The process of this invention can further be used to perform what is commonly known as cosmetic surgery.

DETAILED DESCRIPTION OF THE INVENTION

Anionic vascular sclerosing agents are used, that is, vascular sclerosing agents are used which yield negatively charged ions when in solution. The agents should be nontoxic, preferably water-soluble, and preferably should yield a surface-active anion when in the carrier.

The anionic vascular sclerosing agent can be a material which gives a surface active anion when dissolved in a liquid carrier; and which is a water soluble non-toxic salt having the formula $R^1$—X—M wherein M is the cationic constituent of the salt, wherein X is selected from the group consisting of —OSO$_3$— and —SO$_3$— and is connected to a carbon atom of a hydrocarbon residue in $R^1$, and wherein $R^1$ is an acyclic group containing at least 10 carbon atoms and consisting of a chain of carbon-containing residues of which at least part are hydrocarbon residues, said $R^1$ comprising at least one branched chain alkyl group having at least six carbon atoms.

Examples of anionic vascular sclerosing agents are sodium dioctyl sulfosuccinate, oleoglycerol sulfate, sodium alkyl naphthyl sulfonate, sodium dioctyl sulfosuccinate, sodium stearylmethylaminoethane sulfonate, sodium salt of tetrahydronaphthalene sulfonate, and sodium aryl polyether sulfonate.

Examples of other vascular sclerosing agents are the amine fatty acid soaps, such as, triethanolamine stearate, triethanolamine oleate, monoethanolamine oleate, mixed isopropanolamine oleate, morpholine stearate and triethanolamine coconut oil soaps.

The preferred anionic vascular sclerosing agent is sodium tetradecyl sulfate or sodium 2-methyl-7-ethylundecyl-4 sulfate. It is an anionic surface-active agent, and is soluble in ethanol and water. A five percent solution in water is clear and colorless, and is nearly neutral to alkaline (pH range is 6.5 to 9.0). Its structural formula is:

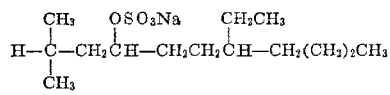

Sodium tetradecyl sulfate is commercially available under the trade designation of Sotradecol (or Sodium Sotradecol) from Wallace & Tiernan Inc. in sterile aqueous solutions of 1, 3 and 5 percent by weight solutions, each of which contained 2 percent by weight benzyl alcohol, and phosphate buffer pH 7.8.

The sodium in sodium tetradecyl sulfate can be replaced with any alkaline metal, e.g., potassium, lithium rubidium and caesium, or ammonium or zinc. Sodium is preferred because it is most compatible with the human and animal systems.

Sterilized clear solutions comprising water as a liquid carrier in the proportion of at least about 98 parts for 100 parts of the carrier, an anionic vascular sclerosing agent dissolved in the water, and a buffer establishing the pH of the whole in the range of about 7 to 8, the anionic vascular sclerosing agent being in the proportion of 1 to 10 parts by weight for 100 parts of the solution, being a water soluble, non-toxic salt giving a surface active anion when dissolved in the carrier, and being a branched chain alkyl sulfate containing at least six carbon atoms in the alkyl group, and a water-soluble-salt forming component, can be prepared by the method set forth in U.S. Pat. No. 2,497,742, the pertinent portions thereof being incorporated herein by reference. The preferred sodium tetradecyl sulfate can be prepared by the method of that patent.

Up to about 5 weight percent, based on the weight of the total composition, of mild local anesthetics and/or antiseptics can be added. Examples of such materials are chlorobutanol and benzyl alcohol.

The composition can contain a buffering agent, such as, sodium phosphate such as secondary sodium phosphate, sodium carbonate, or the salt of a weak organic acid with a strong base of which sodium citrate is an example.

This invention is particularly useful in treating the equine. The bio-mechanics of the equine lead specifically to common areas of stress when the animal is engaged in the normal vigors of training, working or racing. One of the most common areas which receives a maximum amount of trauma is the carpal joint. This is an "occupational stress area" in the race horse and could be compared to the "occupational stress area" of the shoulder and/or elbow of the baseball pitcher or the knee and/or wrist of the football player.

The vascular anionic sclerosing agent should be as non-necrotic as possible so that other body tissue is not seriously damaged, etc.

Arthritis in several animals involves a gradual enlargement of the affected joint, and leads to bony enlargements and thickening of the soft parts, resulting in permanent deformity of the affected joint. Hogs, for example, experience such conditions which are similar to rheumatoid arthritis in lambs and may occur without noticeable swelling of the joints.

After or along with the treatment of the unwanted bone cells at or near the site of the break, fracture or nonunion with the vascular sclerosing anionic agent, the bone fracture, break or nonunions of the man or the animal can be treated. This additional process includes: aligning (only when necessary) the bone parts to position for setting; and then injecting at least one dosage of a liquefied composition comprised of a non-necrotic vascular sclerosing agent and a liquid carrier into the site of the fracture, break or nonunion area of the bone until there is a substantially complete bone union. This additional process is described in detail in my co-pending application Ser. No. 113,362, filed on Feb. 8, 1971, and titled "Method of Treating Bone Fractures and Non-Unions," the pertinent portions of which are incorporated herein by reference. Preferably another dosage is injected a week or two after the first dosage and then every week or two thereafter, as needed, until there is a substantially complete bone union. Preferably each dosage of the liquefied composition is injected into the site of the fracture, break or nonunion at its axis. By injecting a non-necrotic vascular sclerosing agent at the axis of the fracture "struts" are chemically introduced, giving rise to sheer, and thus alignment. The lack of the cast not only eliminates atrophy of muscles and the complication of "lipping," but the movement of bone against the tension of muscle insertion helps to promote the flow of blood to and from the damaged area.

The non-necrotic vascular sclerosing agent can be, among other things, a fatty acid compound, e.g., a fatty acid salt or a fatty acid soap. The preferred non-necrotic vascular sclerosing agent is sodium morrhuate. The preferred liquid carrier is water.

The preferred liquefied composition is comprised of sodium morrhuate, enough sodium hydroxide to obtain a pH between about 9 and about 10, and water. It is also desirable to place up to 5 weight percent of benzyl alcohol in that liquefied composition.

All of the components of the liquefied composition must be substantially non-toxic in the amounts and under the conditions of use.

The pH of the liquefied composition should be between about 8 and about 11, and preferably between 9 and about 10. Each non-necrotic vascular sclerosing agent will produce a different pH at different concentration levels so non-toxic agents may be aded to adjust the pH level, e.g., sodium hydroxide can be used when sodium morrhuate is used.

Natural or synthetic fatty acids can be used to form the fatty acid compound. Mixtures of fatty acids can be used.

Useful fatty acids for forming the fatty acid compounds may be saturated or unsaturated. The useful saturated fatty acids are represented by the general formula: RCOOH, where R can be H, an alkyl group, branched or straight chain. Examples of useful saturated fatty acids are formic acid, acetic acid, propionic acid, n-butyric acid, isobutyric acid, N-valeric acid, n-caproic acid, n-heptoic acid, caprylic acid, n-nonylic acid, capric acid, undecylic acid, lauric acid, tridecylic acid, myristic acid, pentadecylic acid, palmitic acid, margaric acid, stearic acid, nonadecanoic acid, heneicosanoic acid, triosanic acid, lignocerid acid, pentacosanoic acid, cerotic acid, arachidic acid and behenic acid. Examples of useful unsaturated fatty acids are oleic acid, linoleic acid, linolenic acid, licanic acid, eleostearic acid, ricinoleic acid, clupanodonic acid and palmitoleic acid. The useful unsaturated fatty acids can be those containing one double bond, e.g., oleic acid, two double bonds, e.g., linoleic acid, three double bonds, e.g., eleostearic, etc.

Useful fatty acids for forming the fatty acid salts which contain one or more hydroxyl groups are e.g., dihydroxystearic acid. Useful hydrogenated fatty acids are cod liver oil fatty acids, tallow fat fatty acids, castor oil fatty acids, rape oil fatty acids, peanut oil fatty acids, cottonseed oil fatty acids, corn oil fatty acids, soybean oil fatty acids, linseed oil fatty acids, tung oil fatty acids, oticica oil fatty acids, lard oil fatty acids, neat's-foot oil fatty acids, whale oil fatty acids, olive oil fatty acids, coconut fat fatty acids, palm fat fatty acids, butter fat fatty acids, lard fat fatty acids and fish oil fatty acids. The useful hydrogenated fatty acids can be obtained from vegetable oils and fats, and animal oils and fats. Polymeric fatty acids can be used.

The fatty acid compound can be a fatty acid salt. The fatty acid salts can be those prepared from metals, such as, aluminum and alkaline earth metals, e.g., calcium, but are preferably those prepared by alkali metals, e.g., sodium (preferred) lithium, potassium, caesium and rubidium. (Ionic fatty acid compounds such as, sodium morrhuate are preferred, even though the potassium salts are usually more soluble.) The metals are used as compounds such as hydroxides, carbonates, etc. The fatty acid salts can be prepared from ammonia and similar non-metallic inorganic bases. The fatty acid compounds can be esterified fatty acids, e.g., methyl formate, ethyl propionate and n-amyl acetate. The fatty acid compounds can be soaps such as the reaction products of the fatty acids and organic bases, e.g., methylamine, triethanolamine, monoethanolamine, diethanolamine, phenyl ethanol amine, ephedrine and pseudoephedrine. Fatty acid soaps of mono-, di- and tri-alkyl amines and aryl amines can be used.

U.S. Pat. No. 2,115,491 teaches a method of preparing the sodium salts or soaps of the fatty acids of psyllium seed oil. Amine soaps of the fatty acids can be prepared by the method taught by U.S. Pat. No. 2,090,456. U.S. Pat. No. 1,767,041 discloses a method of making the product of alkali metals and fatty acids. The other fatty acid compounds can be made by methods readily known by those ordinarily skilled in the art.

The liquefied solutions should contain between about 0.5 and about 10 percent by weight of the fatty acid compound, and preferably contain between about 1 and about 5 percent by weight of the fatty acid compound.

Examples of specific useful compounds of fatty acids which can be used as non-necrotic vascular sclerosing agents are: sodium morrhuate (a mixture of the sodium salts of the fatty acids of cod liver oil); sodium psylliate (a mixture of the sodium salts of psyllium oil liquid fatty acids); sodium ricinoleate; ethylamine oleate; monoethanolamine oleate; sodium formate; sodium acetate; and calcium propionate. Salts of fatty acids are preferred, particularly those formed from alkali metals, and the preferred fatty acid salt is sodium morrhuate.

Examples of other useful non-necrotic sclerosing agents are dextrose and invert sugar. (Invert sugar is a mixture of dextrose and levulose obtained by the inversion of sucrose.) Solutions containing, for example, dextrose (25 wt. percent) and sodium chloride (15 wt. percent), or invert sugar (30 wt. percent) and sodium chloride (10 wt. percent) can be used. Solutions containing about 50 percent by weight of dextrose are preferred. Solutions containing about 60 to about 75 percent by weight of invert sugar are preferred.

The fatty acid compounds (preparations) are preferred over the other useful non-necrotic vascular sclerosing agents because, for among several reasons, less of the liquefied composition (dosage) is needed. This means that less concentrated fatty acid compound preparations are needed than the more concentrated preparations such as those containing dextrose or invert sugar.

Solutions of dextrose or invert sugar or salts of fatty acids are not very irritating and do not produce necrosis.

Examples of the liquid carrier for the non-necrotic vascular sclerosing agent are water; monoglycerides; di-glycerides; etc. Water is the preferred liquid carrier, and salt (NaCl) can be added to make an isotonic aqueous solution as the liquid carrier.

The useful vascular sclerosing agents must be non-necrotic in effect or operation. Sclerosing agents to be useful must not cause the pathologic death of one or more cells, or a portion of tissue or organ, resulting from irreversible damage to the nucleus.

Anodynes in amounts of up to and including about 5 percent by weight may be added. An anodyne is an agent which has the power to relieve pain. An example of a useful anodyne is benzyl alcohol. In general small amounts of antiseptics or anaesthetics can be used.

Suitable preservatives can be added in an amount not to exceed 0.5 percent by weight.

In some instances it may be necessary to use traction, but a cast as such is not used.

Unless otherwise stated or indicated in the following examples, all percentages and proportions are expressed on a weight basis.

The following examples further illustrate, but do not limit, this invention.

EXAMPLE 1

Fifty parts of sodium tetradecylsulfate (sodium 2-methyl-7-ethylundecyl-4-sulfate) were dissolved in 1,000 parts of distilled water. A small proportion of sodium phosphate or monosodium phosphate is added as a buffer to establish the pH at approximately 7.2. The solution so made was placed into vials (ampules) which were sealed or stoppered and then sterilized by autoclaving for 15 minutes at 15 lbs. gage steam pressure. The sterilized containers and solution were then allowed to cool and retained until ready for use. One of the ampules was used to fill a hypodermic needle syringe. The liquefield composition was injected into the region immediately around some "spurs" or abnormal new bone proliferations at the edges of a fresh break of the coffin bone of a horse The treatment was not painful. Another injection was made on the fifth day and about every five days there after until the spurs were substantially removed The spurs were substantially removed in about 21 days.

EXAMPLE 2

Thirty parts of sodium tetradecyl sulfate of the kind described in Example 1 and 20 parts of benzyl alcohol as a local anesthetic were dissolved in 1,000 parts of distilled water. The solution was vialed (in ampules) and then sterilized at 10 lbs. gage steam pressure for one-half hour. One of the ampules was used to fill a hypodermic needle syringe. The liquefied composition was injected into the region immediately around some "spurs" or abnormal new bone proliferations at the edges of a fresh break of the coffin bone of a horse. The treatment was not painful. Another injection was made on the fifth day and about every five days there after until the spurs were substantially removed.

EXAMPLE 3

Fifty parts of the sodium salt of tetrahydronaphthalene sulfonate in purified condition and 5 parts trichlorbutanol as an antiseptic were dissolved in 1,000 parts of distilled water. The pH was adjusted to a value of 7.2 by the addition of an aqueous solution of monosodium phosphate or disodium phosphate. The resulting sclerosing composition is enclosed in vials and sterilized as in Example 2. One of the ampules was used to fill a hypodermic needle syringe. The liquefied composition was injected into the region immediately around some "spurs" or abnormal new bone proliferation at the edges of a fresh break of the coffin bone of a horse. The treatment was not painful. Another injection was made on the fifth day and about every five days thereafter until the spurs were substantially removed.

EXAMPLE 4

Example 2 was repeated except that the sodium tetradecyl sulfate was replaced with the sodium sulfate derivative of 3,9-diethyltridecanol-6. Injection was continued until the spurs were substantially removed.

EXAMPLE 5

Forty parts of a product having the formula $$(C_{17}H_{33}CONHC_2H_4SO_3Na)$$

and 5 parts of chlorothymol as naantiseptic were dissolved in 1,000 parts of distilled water. The resulting composition was charged into vials (ampules) and sterilized in Example 2. One of the ampules was used to fill a hypodermic needle syringe. The liquefied composition was injected into the region immediately around some "spurs" or abnormal new bone proliferation at the edges of a fresh break of the coffin bone of a horse. The treatment was not painful. Another injection was made on the fifth day and about every five days thereafter until the spurs were substantially removed.

EXAMPLE 6

Forty parts of sodium stearylmethylaminoethane sulfonate, and 20 parts of benzyl alcohol were dissolved by the addition of 940 parts of distilled water. The solution was then filtered through a dense Berkefeld filter and charged into sterile vials (ampules) under aseptic conditions. The formula of sodium stearylmethylaminoethane sulfonate is:

One of the ampules was used to fill a hypodermic needle syringe. The liquefied composition was injected into the region immediately around some "spurs" or abnormal new bone proliferation at the edges of a fresh break of the coffin bone of a horse. The treatment was not painful. Another injection was made on the fifth day and about every five days thereafter until the spurs were substantially removed.

EXAMPLE 7

Example 1 was repeated on spurs that had developed around a chip fracture in the carpus of a horse. Injection was continued until the spurs were substantially removed.

EXAMPLE 8

Forty parts of oleoglycerol sulfate whose active ingredient is an alkenoyl (unsaturated fatty acid residue) glycerol sulfate, was dissolved in 1,000 parts of water. The material was charged into ampules and sterilized as described under Example 1. One of the ampules was used to fill a hypodermic needle syringe. The liquefied composition was injected into the region immediately around some "spurs" or abnormal new bone proliferation at the edges of a fresh break of the coffin bone of a horse. The treatment was not painful. Another injection was made on the fifth day and about every five days thereafter until the spurs were substantially removed.

EXAMPLE 9

Twenty parts of sodium dioctyl sulfosuccinate and 10 parts of benzyl alcohol were dissolved in 1,000 parts of distilled water. Buffer was added to establish the pH at 7.8. The solution was then charged into ampules and sterilized for one-half hour at approximately 100° C. in an Arnold type of sterilizer. One of the ampules was used to fill a hypodermic needle syringe. The liquefied composition was injected into the region immediately around some "spurs" or abnormal new bone proliferation at the edges of a fresh break of the coffin bone of a horse. The treatment was not painful. Another injection was made on the fifth day and about every five days thereafter until the spurs were substantially removed.

EXAMPLE 10

One hundred parts of an aqueous solution containing 27% of sodium aryl polyether sulfate was mixed with 5 parts of phenol and 893 parts of distilled water. The solution is then filled into ampules and sterilized in an Arnold type of sterilizer. The composition of the present example is represented by the formula:

$$\text{Aryl-}(OOC_2CH_2)_n OSO_3 Na$$

One of the ampules was used to fill a hypodermic needle syringe. The liquefied composition was injected into the region immediately around some "spurs" or abnormal new bone proliferation at the edges of a fresh break of the coffin bone of a horse. The treatment was not painful. Another injection was made on the fifth day and about every five days thereafter until the spurs were substantially removed.

EXAMPLE 11

Thirty parts of sodium decylbenzyl sulfonate was dissolved in 970 parts of distilled water and filtered through a dense sintered glass filter to eliminate suspended particles, pyrogens and other foreign undissolved material. It was then charged into ampules and sterilized by autoclaving in the usual manner. The formula for sodium decylbenzyl sulfonate is:

One of the ampules was used to fill a hypodermic needle syringe. The liquefied composition was injected into the region immediately around some "spurs" or abnormal new bone proliferation at the edges of a fresh break of the coffin bone of a horse. The treatment was not painful. Another injection was made on the fifth day and about every five days thereafter until the spurs were substantially removed.

EXAMPLE 12

Example 1 was repeated on a horse having a broken coffin bone. Then the following procedure was followed to treat the break itself. A liquefied composition containing 5 weight percent of sodium morrhuate, 3 weight percent of ethanol, enough NaOH to obtain a pH of 9.5 and the remainder water. The liquefied composition was placed in several 2 cc. ampules. One of the ampules was used to fill a hypodermic needle syringe. The liquefied solution was injected into the axis or plane of the break of the coffin bone of the horse, the ends being held manually in alignment during the injection. No cast was used and the horse was not suspended. The treatment was not painful. X-rays indicated that "struts" (of callus along the line of stress) were produced, giving rise to sheer and thus alignment. The horse was able to "test out" the leg and successfully put minor weight in a very short time. Another injection was made on the tenth day, and about every ten days thereafter until the fracture was substantially cured.

EXAMPLE 13

Example 12 was repeated, except that the liquefied composition containing the non-necrotic vascular sclerosing agent of Example 12 was replaced with an aqueous solution (2 cc. ampule) containing 5 percent of sodium morrhuate and enough NaOH to bring the pH up to 9.5. The fracture was substantially cured in about three months after repeated injections.

EXAMPLE 14

Example 12 was repeated, except that the liquefied composition containing the non-necrotic vascular sclerosing agent of Example 12 was replaced with an aqueous solution (2 cc. ampule) containing 5 percent ethylamine oleate and 2 percent benzyl alcohol. The fracture was substantially cured in about three months after repeated injections.

EXAMPLE 15

Example 12 was repeated, except that the liquefied composition containing the non-necrotic vascular sclerosing agent of Example 12 was replaced with an aqueous solution (2 cc. ampule) containing 5 percent ethylamine oleate. The fracture was substantially cured in about three months after repeated injections.

EXAMPLE 16

Example 12 was repeated, except that the liquefied composition containing the non-nectrotic vascular sclerosing agent of Example 12 was replaced with an aqueous solution (2 cc. ampule) containing 5 percent of sodium morrhuate, 3 percent of benzyl alcohol, and enough NaOH to bring the pH up to 9.5. The fracture was substantially cured in about three months after repeated injections.

EXAMPLE 17

Example 12 was repeated, except that the liquefied composition containing the non-necrotic vascular sclerosing agent of Example 12 was replaced with an aqueous solution (5 cc. vial) containing 5 percent of sodium psylliate and 2 percent by weight of benzyl alcohol. That aqueous solution had a pH of 8.9 (enough 10% NaOH solution was added to achieve that level). The fracture was substantially cured in about three months after repeated injections.

EXAMPLE 18

Example 12 was repeated, except that the liquefied composition containing the non-necrotic vascular sclerosing agent of Example 12 was replaced with an aqueous solution (2 cc. vial) containing 5 percent of sodium psylliate. A NaOH solution was added to obtain a pH level of 8.7. The fracture was substantially cured in about three months after repeated injections.

What is claimed is:

1. A process of accelerating the death and destruction of bone cells which are producing unwanted new bone proliferation in man and animal comprising injecting at least one dosage of a liquefied composition comprising a vascular sclerosing anionic agent and a liquid carrier into or around the immeditae vicinity of said abnormal new bone proliferation, said dosage being between about 1 cc. and about 10 cc., and said dosage containing between about 0.5 weight percent and about 5 weight percent of said vascular sclerosing anionic agent.

2. A process as described in claim 1 wherein said vascular sclerosing anionic agent is sodium tetradecyl sulfate.

3. A process as described in claim 2 wherein said liquid carrier is water, wherein said dosage contains two percent by weight of benzyl alcohol, is buffered with disodium phosphate and is adjusted with sodium hydroxide or sodium dihydrogen phosphate to a pH between 7 and 8.1, and wherein 3 percent of said sodium tetradecyl sulfate is present in said dosage.

4. A process as described in claim 1 wherein said dosage contains between about one weight percent and about 3 weight percent of said vascular sclerosing anionic agent.

5. A process as described in claim 1 wherein the dosages after the first dosage are administered about every five days.

6. A process as described in claim 1 wherein said unwanted new bone proliferation occurs immediately around the region of or on the perimeter of a broken, fractured bone or nonunion of bones.

7. A process as described in claim 6, wherein, after or concurrently with said injections of said vascular sclerosing anionic agent, at least one dosage of a liquefied composition comprising a fatty acid or fatty acid salt non-necrotic vascular sclerosing agent and a liquid carrier is injected into the site of said fracture, break or nonunion area of said bone until there is a substantially complete bone union.

8. A process as described in claim 7 wherein a dosage of said liquefied composition is injected into the site of said fracture, break or nonunion every week or two until there is a substantially complete bone union.

9. A process as described in claim 7 wherein said dosage of said liquefied composition are injected into the site of said fracture, break or nonuinon at its axis.

10. A process as described in claim 7 wherein said fatty acid salt non-necrotic vascular sclerosing agent is a salt of a fatty acid and an alkali metal.

11. A process as described in claim 7 wherein said liquid carrier is water.

References Cited

Chem. Abst. Seventh Collective Index, vol. 56–65 (1962–1966), p. 3856S.

SAM ROSEN, Primary Examiner

U.S. Cl. X.R.

424—317, 318